United States Patent [19]
Hickman et al.

[11] Patent Number: 5,668,882
[45] Date of Patent: Sep. 16, 1997

[54] NOTEBOOK COMPUTER SPEAKERS

[75] Inventors: Scott Nobel Hickman; Mark A. Smith; Brian G. Spreadbury, all of Corvallis; Dennis R. Esterberg, Philomath, all of Oreg.

[73] Assignee: Hewlett-Packard Company, Palo Alto, Calif.

[21] Appl. No.: 637,948

[22] Filed: Apr. 25, 1996

[51] Int. Cl.$^6$ ................................. H04R 5/00
[52] U.S. Cl. .................... 381/24; 381/88; 381/159; 381/182
[58] Field of Search ................ 381/24, 188, 159, 381/205, 90, 88, 182; 181/148, 144

[56] References Cited

U.S. PATENT DOCUMENTS

| | | |
|---|---|---|
| 3,945,461 | 3/1976 | Robinson . |
| 5,123,500 | 6/1992 | Malhoit .................................. 181/144 |
| 5,481,616 | 1/1996 | Freadman .............................. 381/24 |
| 5,550,921 | 8/1996 | Freadman .............................. 381/24 |
| 5,588,063 | 12/1996 | Edgar ..................................... 381/24 |
| 5,610,992 | 3/1997 | Hickman ................................ 381/188 |

OTHER PUBLICATIONS

Acoustics, Leo L. Beranek, Massachusetts Institute Of Technology, Copyright 1954, 1986, 1990, and 1993, p. 93.

Impedance Analysis Of Subwoofer Systems, Arthur P. Berkhoff, Journal Of Audio Engineering Society, vol. 42, No. 1/2, Jan./Feb. 1994, pp. 4–14.

Loudspeakers In Vented Boxes: Part 1, A. N. Thiele, Journal Of The Audio Engineering Society, May 1971, vol. 19, No. 5, pp. 382–392.

Loudspeakers In Vented Boxes: Part II, A. N. Thiele, Journal Of The Audio Engineering Society, Jun. 1971, vol. 19, No. 6, pp. 471–483.

*Primary Examiner*—Minsun Oh

[57] ABSTRACT

A loudspeaker configuration for a notebook computer includes one or more high frequency "upper" speakers and a low frequency "lower" speaker. The upper speakers are mounted within a display housing and emit sounds over a range including directional sounds having wavelengths less than one-third the upper speaker diameter. The "lower" speaker is mounted within a keyboard housing. The lower speaker is oriented downward onto the desktop or other support surface and displaces a larger volume of air than the upper speaker. Open space between a processor board and a lower housing base surface define an internal speaker-box chamber for the lower speaker. The housing base surface and a support surface for the computer defining an external speaker box for the lower speaker. The internal speaker box and external speaker box define a band pass acoustic filter for sound waves emitted from the second speaker. The sound waves passing through the band pass filter occur to a listener as non-directional sound. The directional high frequency sounds emitted from the upper speaker(s) are enriched with the non-directional sounds of the upper and lower speakers, resulting in improved sound quality.

13 Claims, 3 Drawing Sheets

NOTEBOOK COMPUTER SPEAKERS

BACKGROUND OF THE INVENTION

This invention relates generally to portable computers having one or more loudspeakers for emitting audible sound, and more particularly to a notebook computer loudspeaker configuration for improving audible sound quality at low frequencies.

A conventional notebook computer is approximately the size of a standard sheet of paper, (e.g., 21.6 cm by 27.9 cm; or in English units —8.5 inches by 11.0 inches). The thickness of such a notebook computer typically is 5.0 cm to 8.0 cm. In efforts to increase transportability and usability, the evolution has been toward smaller, lighter portable computers. The typical notebook computer includes a display screen housing hinged to a keyboard housing. The display screen housing folds down against the keyboard where the two housings latch together. A processor board, keyboard and disk drive often are mounted within the keyboard housing. Additional features include input/output ports and one or more compartments for receiving PC cards, (i.e., peripheral devices conforming to the Personal Computer Memory Card International Association (PCMCIA) standards for personal computer-based peripherals). In an effort to bring multimedia applications to the notebook computer, loudspeakers and sound cards also may be included.

A shortcoming of loudspeakers used with notebook computers is the generally inferior sound quality achieved relative to conventional stereophonic shelf-top speakers, or even, internal or external speakers used with desktop computers. One reason for the poorer sound quality is the relatively smaller speaker sizes. The smaller speaker size makes it difficult to produce quality sound over a wide frequency range, and particularly at lower frequencies. Coupled with the restricted speaker-box volume in which the loudspeaker is housed, quality sound at lower frequencies is difficult to achieve. Larger speaker-boxes provide space for accommodating given wavelengths of sound waves. Increasing the size of a notebook computer to accommodate significant speaker-box sizes is undesirable, however. Such inclusion would be a trade-off on the transportability of the computer. Accordingly, there is a need for a speaker configuration in a notebook computer which improves sound quality without increasing the size requirements of the computer housing.

SUMMARY OF THE INVENTION

Loudspeakers by nature are acoustical high pass devices. To improve sound quality it is desirable to extend the frequency range of the small speakers typically used with a notebook computer. According to the invention, a loudspeaker configuration for a notebook computer includes one or more high frequency "upper" speakers and a low frequency "lower" speaker. The lower speaker serves as a point acoustic source which enhances the sound heard from the upper speakers. Over at least a part of the upper speaker frequency band, the upper speakers are perceived as being acoustic non-point sources. A speaker is perceived as a point source when its radius is small compared with 1/6 wavelength of emitted sounds. Sounds having wavelengths shorter than one-sixth the speaker radius are not perceived as point sources, (e.g., are directional sources).

According to one aspect of the invention, each upper speaker is mounted within the display cabinet of the notebook computer, and the lower speaker is mounted within the keyboard housing of the notebook computer. Such lower speaker is oriented downward onto the desktop or other surface supporting the notebook computer. In one embodiment the lower speaker has a comparatively larger speaker diameter than the upper speaker(s). In addition, open space occurring between a processor board (within the keyboard housing) and a base portion of the keyboard housing defines a speaker-box chamber for the lower speaker. A grill opening through the base surface defines several openings for the lower speaker's sound waves to exit the keyboard housing. A flat supporting surface, such as a table or desk, combines with the housing undersurface to form another sound chamber and port opening for the speaker external to the keyboard housing.

According to another aspect of the invention, the external sound chamber forms an acoustical low pass filter which limits the amplitude (volume) of any high frequency sound waves that may be emitted by the lower speaker. Together with the high pass function of the internal speaker box of the lower speaker, the two sound boxes define an acoustic band pass structure. Further, the sound waves within the frequency passband are much larger than one-third the speaker diameter. Accordingly, a listener is unable to sense the specific source location of sounds emanating from the lower speaker.

One advantage of the invention is that the sounds emitted from the upper speaker(s) are enriched with the non-directional low frequency sounds of the lower speaker resulting in improved sound quality. Another advantage of the invention is the achievement of improved sound quality without enlarging the size of the notebook computer. These and other aspects and advantages of the invention will be better understood by reference to the following detailed description taken in conjunction with the accompanying drawings.

DESCRIPTION OF SPECIFIC EMBODIMENTS

Overview

Figure 1:
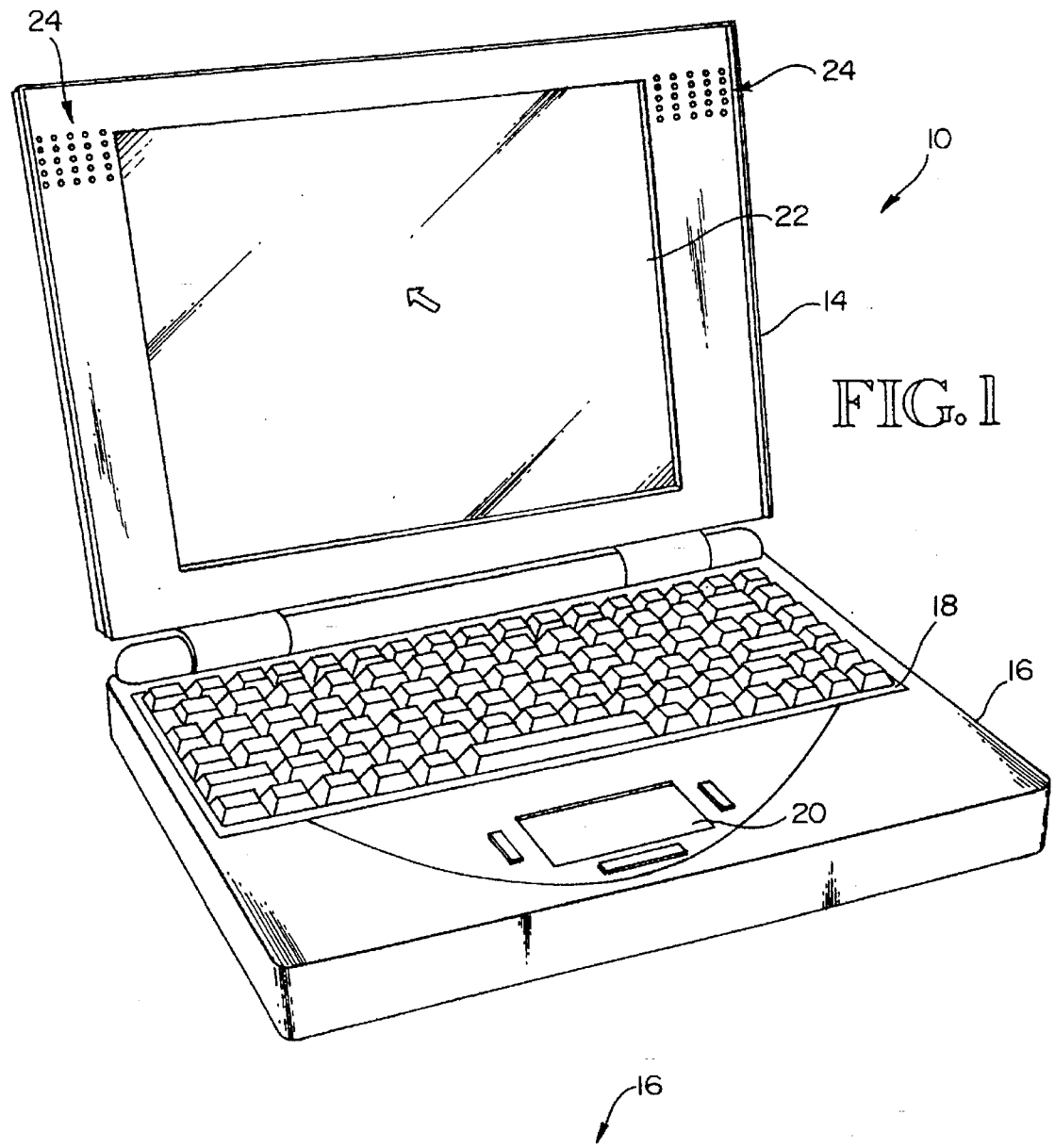
FIG. 1 is a perspective view of a notebook computer according to an embodiment of this invention.
Figure 2:
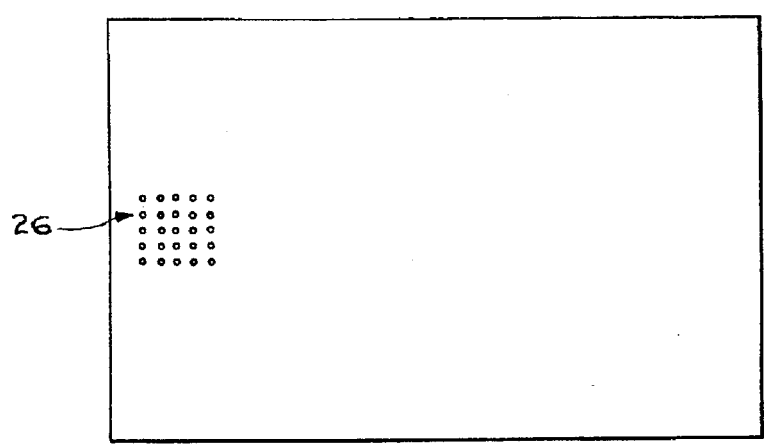
FIG. 2 is a planar view of an external base surface of the notebook computer of FIG. 1.

FIG. 1 shows a notebook computer 10 according to an embodiment of this invention. The computer 10 includes a display screen housing 14 hinged to a keyboard housing 16. A main processor board (not shown) receives inputs from a keyboard 18, and a pointing device 20. The processor board generates outputs to a display screen 22. Other components such as a hard disk drive, floppy disk drive, and CD-ROM drive, are included in various embodiments and electrically coupled to the processor board. In addition one or more PC cards embodying a modem or other peripheral device conforming to the Personal Computer Memory Card International Association standards are included in some embodiments. For example in an embodiment for accommodating multimedia applications a sound card and one or more loudspeakers (i.e., electro-magnetic speakers) are included. One or more upper speakers 24 (see FIG. 1) are mounted within the display housing 14 and a lower speaker 26 (see FIG. 2) is mounted within the keyboard housing 16.

Speaker Mounts

Figure 3:
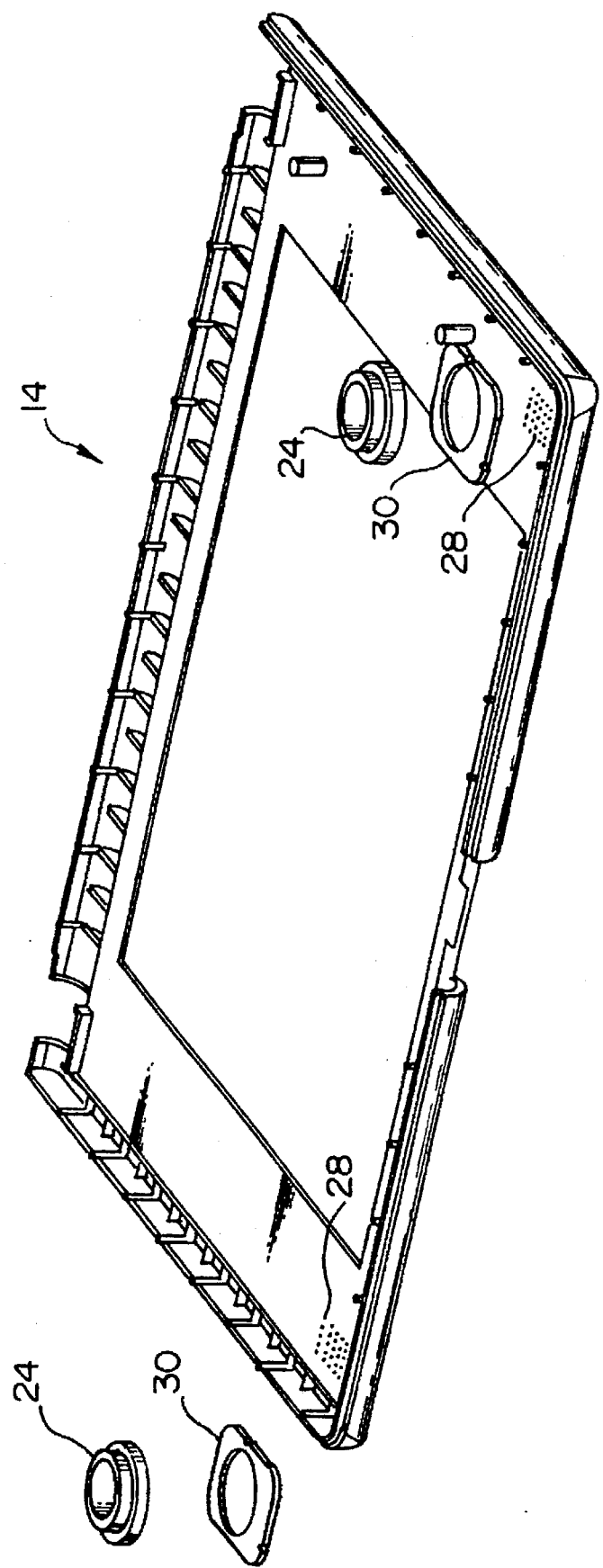
FIG. 3 is a partial exploded view of the display housing and upper speakers of FIG. 1.

FIG. 3 shows a partial exploded view of the display housing 14 with upper speakers 24. Upper speakers 24 are mounted to the display case 14 at respective speaker-grills 28 via foam seals 30. The foam seals 30 acoustically isolate out of phase sound waves from the front and back of the speakers 24 to define a "sealed box" mounting. Typically there is little space behind the speaker for a speaker box. Speaker-grills 28 are defined by several openings in the display housing at a local area adjacent to a respective speaker 24. The speakers 24 are oriented to project sound waves through the speaker-grills 28 out toward a computer user working at the notebook computer 10. In one embodiment one or more 23 mm diameter speakers, model number KR-231, manufactured by Keyrin Electronics Company, Ltd. of Seoul, Korea are used. In a corresponding embodiment the seals 30 are Hewlett-Packard part number F1065-20002, manufactured by Boyd Rubber Corp. of Portland, Oreg.

Figure 4:
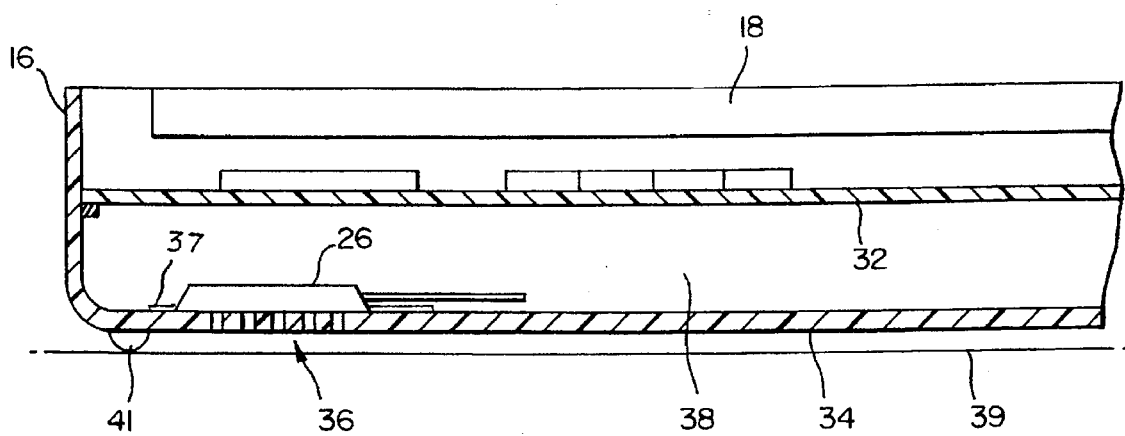
FIG. 4 is a partial cutaway view of the keyboard housing of FIG. 1, along with the components mounted within the keyboard housing.

FIG. 4 shows a partial cut-away view of the keyboard housing 16 with keyboard 18, processor board 32 and lower speaker 26. In a preferred embodiment the lower speaker 26 is mounted to a plastic base surface 34 of the keyboard housing 16 via foam seals 37. The foam seals 37 are Hewlett-Packard part number F1067-20001, manufactured by Boyd Rubber Corp. of Portland, Oreg. The foam seals acoustically isolate out of phase sound waves from front and back sides of the speaker 26 to define a sealed box mounting. A speaker-grill 36 is defined by several opening in the base surface 34 adjacent to the lower speaker 26. The lower speaker 26 is oriented to project sound downward out the speaker-grill 36 and toward any underlying support surface upon which the computer 10 resides. A speaker-box 38 is defined as the air volume surrounding the speaker 26 within the keyboard housing 16. Such speaker-box 38 includes the base surface 34 as one boundary and the processor board 32 as another boundary. The speaker 26 with the base surface 34 and processor board 32 define an acoustic chamber which acts as a closed-box portion 42 (see FIG. 5) of an acoustical band pass filter. The speaker 26 is sealed to the base surface 34. In one embodiment the base surface 34 has a thickness of approximately 1.5 mm and is composed of PC/ABS plastic. In one embodiment a 36 mm diameter speaker, model number 36-8B-51BC, manufactured by Keyrin Electronics Company, Ltd. of Seoul Korea is used.

In many applications the computer 10 rests on a table, desk or other generally flat surface 39. Typically the computer 10 includes footings 41 which elevate the computer 10 above the support surface 39. The undersurface of the computer base surface 34 together with the flat or other support surface 39 define boundaries for another sound chamber 44 (see FIG. 5). The height of the footings 41 and the area of the base surface 34 typically define the volume of this additional sound chamber 44. In one embodiment the footings have a height of approximately 2 mm. The openings formed between footings 41 in the volume between the base surface 34 and support surface 39 define four acoustic ports 46, 48, 50, 52 (see FIG. 5) for sound waves to exit.

Figure 5:
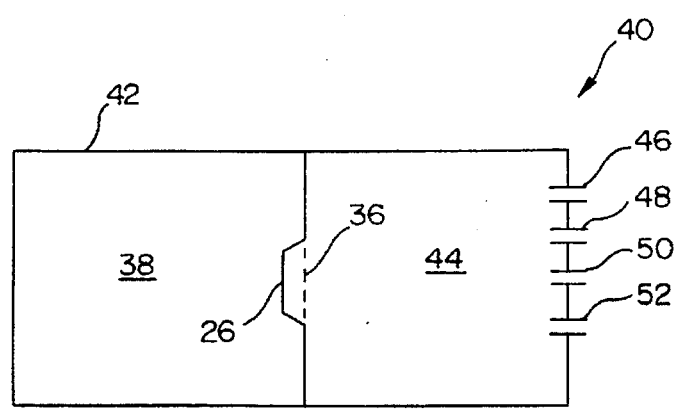
FIG. 5 is a diagram of the acoustic bodies defined by the speaker and adjacent chambers of FIG. 4.

Referring to FIG. 5, the enclosed speaker box 38 and additional sound box 44 are shown with the speaker 26. Sound waves from speaker 26 and speaker box 38 pass through the grill plate 36 into the sound chamber 44. Sound waves travel through the speaker box 38 out the ports 46, 48, 50, 52. FIG. 5 depicts an acoustic band pass schematic in which the speaker box 38 serves as an acoustic high pass structure and the external sound box 44 serves as an acoustic low pass structure.

Speaker Audio Characteristics

The upper speakers 24 emit sound waves over a range of frequencies. In one embodiment the speakers 24 are operated at a nominal impedance of 32 ohms. The frequency range of the speakers 24 as mounted within the display housing 14 ranges between approximately 400 hz and 15000 hz. A relatively small area behind the first speakers 24 limits the low end frequency range of the speakers. For a speaker 24 having a diameter of 23 mm, sound waves having a frequency much larger than the 5000 hz occur as directional sounds. For a speaker diameter of 1 mm, sounds having a wavelength much greater than 3 mm are non-directional. For a speaker diameter of 23 mm, sounds having a wavelength much more than 69 mm are non-directional. Taking the speed of sound as 345 m/sec, the frequency corresponding to a 69 mm sound wave is approximately 5 kHz. Thus, for the speaker having a 23 mm diameter sounds having a frequency much less than 5 kHz typically are non-directional.

In one embodiment the 36 mm lower speaker 26 has frequency range of approximately 150 to 7000 hz and operates at a nominal impedance of 8 ohms. In other embodiments the speaker 26 is operated at a nominal impedance matching that of the upper speaker(s) 24 (e.g., 32 ohms). Operating the lower speaker 26 at a lower impedance than the upper speaker(s) 24 increases the amplitude of lower speaker sound waves relative to upper speaker(s) sound waves. For a 23 mm upper speaker diameter, emitted sound waves having a wavelength less than 108 mm are directional. This corresponds to frequencies greater than 3.2 kHz. Sound waves emitted from the lower speaker having a frequency less than 3.2 kHz are generally non-directional, while sounds greater than 3.2 kHz are directional.

In operation, the lower speaker 26 vibrates upward and downward relative to a plane of the base surface 34. Such vibration compresses air in the speaker-box 38. With the computer 10 at rest on a support surface (e.g., table desk), an additional sound chamber 44 is defined by the base surface 34 undersurface and the support surface. Such speaker box 38 and sound chamber 44 serve as parts of a band pass filter 40.

In one embodiment a 36 mm speaker 26 is mounted to a base surface 34 composed of PC/ABS plastic and having a thickness of 1.5 mm. An air volume of approximately 400,000 $mm^3$ is defined between the base surface 34 and processor board 32. The processor board is composed of FR4 material and has a thickness of approximately 1.0 mm, (although the effective thickness varies in areas where components are mounted to the board 32). The passed sounds typically are below the directional frequency cut-off for the 36 mm speaker. Accordingly the sounds emanating from the keyboard housing 16 originating at the speaker 26 are non-directional such that sound is perceived to be originating from the more directional speaker system (speakers 24) in the display housing 14. The speaker radius or diameter alone determines the approximate non-directional nature of the sound waves.

When at rest on a support surface 39 the base of the notebook computer as elevated by footings 41 defines a low pass filter which substantially attenuate sounds having a frequency greater than approximately 5000 to 7000 hz. Accordingly, the internal speaker box 38 and external sound box 44 serves as the band pass device. It has been found that the band pass construction and more particularly, the low pass portion of the bandpass construction formed by orienting the speaker 26 downward into the base surface 34 and adjacent to a support surface for the computer 10, enhances the overall sound quality of the speakers 24, 26. In particular, the non-directional low frequency sounds of the lower speaker 26 and upper speakers 24 enhance the high frequency directional sounds of the upper speakers 24.

Meritorious and Advantageous Effects

One advantage of the invention is that the sounds emitted from the upper speaker(s) are enriched with the non-directional low frequency sounds of the lower speaker resulting in improved sound quality. Another advantage of the invention is the achievement of improved sound quality without enlarging the size of the notebook computer. Thus, the lower speaker extends the frequency range (the lower bound) that would be generated by the upper speakers alone. Similarly, the presence of the upper speakers extends the frequency range (the upper bound) that would be generated by the lower speaker alone. Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A portable computer comprising: an upper housing, a lower housing, a display screen, a processor board, a keyboard, a first electro-magnetic speaker and a second electro-magnetic speaker; and wherein the display screen and first speaker reside in the upper housing, and the processor board, keyboard and second speaker reside in the lower housing; and wherein the lower housing defines a speaker-grill at a base surface of the portable computer, the second speaker being mounted in proximity to the speaker-grill and being oriented downward to project sound waves through the speaker-grill; an internal speaker-box for the second speaker defined by the base surface and adjacent surfaces within the lower housing, the internal speaker box defining a high pass acoustic filter for the second speaker; and wherein an external speaker box is defined by the base surface and a support surface upon which the portable computer base surface rests, the external speaker box defining a low pass acoustic filter for the second speaker, the internal speaker box and external speaker box defining a bandpass acoustic filter for the second speaker.

2. The portable computer of claim 1, wherein the first speaker emits a range of sounds, the range comprising directional sounds having wavelengths less than one-third of a diameter of the first speaker, the first speaker directional sounds enhanced by non-directional sounds propagating through the band pass acoustic filter of the second speaker.

3. The portable computer of claim 1, further comprising a third speaker, the third speaker residing in the upper housing; and wherein the first speaker and third speaker generate stereophonic sound.

4. The portable computer of claim 1, in which the low pass acoustic filter attenuate sound waves at directional frequencies of the second speaker.

5. The portable computer of claim 1, in which the second speaker has a larger volume of air displacement than the first speaker, the low pass acoustic filter passing sound waves which comprises frequencies outside of a frequency range of the first speaker so as to provide a broader sound frequency range relative to a sound frequency range of the first speaker alone.

6. The portable computer of claim 1, further comprising foam seals between the first speaker and the upper housing for acoustically isolating sound waves from one side of the first speaker from sound waves at an opposite side of the first speaker.

7. The portable computer of claim 1, further comprising foam seals between the second speaker and the lower housing for acoustically isolating sound waves from one side of the second speaker from sound waves at an opposite side of the second speaker.

8. A portable computer comprising: an upper housing, a lower housing, a display screen, a processor board, a keyboard, a first electro-magnetic speaker and a second electro-magnetic speaker;

wherein the display screen and first speaker reside in the upper housing, and the processor board, keyboard and second speaker reside in the lower housing; and wherein the lower housing defines a speaker-grill at a base surface of the portable computer, the second speaker being mounted in proximity to the speaker-grill and being oriented downward to project sound waves through the speaker-grill; an internal speaker-box for the second speaker defined by the base surface and adjacent surfaces within the lower housing, the internal speaker box defining a high pass acoustic filter for the second speaker; and wherein an external speaker box is defined by the base surface and a support surface upon which the portable computer base surface rests, the external speaker box defining a low pass acoustic filter for the second speaker, the internal speaker box and external speaker box defining a bandpass acoustic filter for the second speaker; and wherein the first speaker emits a range of sounds, the range comprising directional sounds having wavelengths less than one-third of a diameter of the first speaker, the first speaker directional sounds enhanced by non-directional sounds emitted from the first speaker and second speaker; and wherein the low pass acoustic filter attenuate sound waves at directional frequencies of the second speaker.

9. The portable computer of claim 8, in which the second speaker has a larger volume of air displaced than the first speaker, the low pass acoustic filter passing sound waves which comprises frequencies outside of a frequency range of the first speaker so as to provide a broader sound frequency range relative to a sound frequency range of the first speaker alone.

10. The portable computer of claim 8, further comprising foam seals between the first speaker and the upper housing for acoustically isolating sound waves from one side of the first speaker from sound waves at an opposite side of the first speaker.

11. The portable computer of claim 8, further comprising foam seals between the second speaker and the lower housing for acoustically isolating sound waves from one side of the second speaker from sound waves at an opposite side of the second speaker.

12. The portable computer of claim 8, further comprising a third speaker, the third speaker residing in the upper housing; and wherein the first speaker and second speaker generate stereophonic sound.

13. The portable computer of claim 8, wherein the low pass acoustic filter attenuates sound waves comprising frequencies greater than 7000 hz.

* * * * *